US012404946B2

United States Patent
Hatano et al.

(10) Patent No.: US 12,404,946 B2
(45) Date of Patent: Sep. 2, 2025

(54) SOLENOID VALVE MANIFOLD

(71) Applicant: CKD Corporation, Komaki (JP)

(72) Inventors: Hisashi Hatano, Komaki (JP);
Mitsuhiro Kosugi, Komaki (JP); Atsuo Hayashi, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 18/556,918

(22) PCT Filed: Mar. 23, 2023

(86) PCT No.: PCT/JP2023/011352
§ 371 (c)(1),
(2) Date: Oct. 24, 2023

(87) PCT Pub. No.: WO2023/195343
PCT Pub. Date: Oct. 12, 2023

(65) Prior Publication Data
US 2024/0209955 A1 Jun. 27, 2024

(30) Foreign Application Priority Data
Apr. 8, 2022 (JP) ................. 2022-064676

(51) Int. Cl.
*F16K 31/06* (2006.01)
*F16K 27/04* (2006.01)
*F16K 11/07* (2006.01)

(52) U.S. Cl.
CPC ........ *F16K 31/0613* (2013.01); *F16K 27/048* (2013.01); *F16K 31/0675* (2013.01); *F16K 11/07* (2013.01)

(58) Field of Classification Search
CPC ............. F16K 31/0613; F16K 31/0675; F16K 31/426; F16K 27/048; F16K 27/041
See application file for complete search history.

(56) References Cited

U.S. PATENT DOCUMENTS

2019/0003610 A1* 1/2019 Lucidera ............ F16K 11/0716
2020/0149650 A1* 5/2020 Kidder ................ F16K 27/048
(Continued)

FOREIGN PATENT DOCUMENTS

JP    H09329269 A    12/1997
JP    2020186781 A   11/2020

OTHER PUBLICATIONS

International Search Report (English and Japanese) and Written Opinion for International Patent Application No. PCT/JP2023/011352, dated May 30, 2023, 8 pages.

*Primary Examiner* — Kelsey E Cary
(74) *Attorney, Agent, or Firm* — Tarolli, Sundheim, Covell & Tummino LLP

(57) ABSTRACT

An electromagnetic valve (11) includes an electromagnetic valve-side connector unit (55, 65). A base (30) includes a base-side connector unit (80, 90) to which the electromagnetic valve-side connector unit (55, 65) is connected. The base (30) includes an insertion port (43, 44) into which the electromagnetic valve-side connector unit (55, 65) is inserted. The base-side connector unit (80, 90) is disposed inside the insertion port (43, 44). The electromagnetic valve (11) includes a protrusion (56, 66). The base (30) includes a recess (87, 97) configured to guide the protrusion (56, 66). When the protrusion (56, 66) is guided by the recess (87, 97), the electromagnetic valve-side connector unit (55, 65) is inserted into the insertion port (43, 44) without interfering with a section of the base (30) around the insertion port (43, 44) and is connected to the base-side connector unit (80, 90).

5 Claims, 8 Drawing Sheets

(56) References Cited

U.S. PATENT DOCUMENTS

| | | | |
|---|---|---|---|
| 2021/0131459 A1* | 5/2021 | Weickel | F16K 37/005 |
| 2021/0324966 A1 | 10/2021 | Hayashi et al. | |
| 2023/0137993 A1* | 5/2023 | Ohki | F15B 13/0857 |
| | | | 251/129.15 |

* cited by examiner

SOLENOID VALVE MANIFOLD

CROSS-REFERENCE TO RELATED APPLICATIONS

This application is a U.S. National Stage Application filed under 35 U.S.C. § 371 of PCT/JP2023/011352, filed Mar. 23, 2023, and entitled "SOLENOID VALVE MANIFOLD", which claims priority from Japanese Patent Application No. 2022-064676, filed on Apr. 8, 2022. The entire contents of each of the above-identified patent applications are incorporated herein by reference.

TECHNICAL FIELD

The present disclosure relates to an electromagnetic valve manifold.

BACKGROUND ART

For example, Patent Literature 1 discloses an electromagnetic valve manifold that includes an electromagnetic valve, a control unit, and a base. The electromagnetic valve includes a solenoid unit. The electromagnetic valve includes an electromagnetic valve-side connector unit. The electromagnetic valve-side connector unit is electrically connected to the solenoid unit. The control unit includes a circuit board. The circuit board controls operation of the electromagnetic valve. The base includes a control unit. The base includes a base-side connector unit. The electromagnetic valve-side connector unit is connected to the base-side connector unit. The base-side connector unit electrically connects the electromagnetic valve-side connector unit and the circuit board to each other. The base includes an insertion port. The base-side connector unit is disposed inside the insertion port. The electromagnetic valve-side connector unit is inserted into the insertion port. When the electromagnetic valve-side connector unit inserted into the insertion port is connected to the base-side connector unit, the electromagnetic valve-side connector unit and the circuit board are electrically connected to each other via the base-side connector unit.

CITATION LIST

Patent Literature

Patent Literature 1: Japanese Laid-Open Patent Publication No. 2020-186781

SUMMARY OF INVENTION

Technical Problem

In such an electromagnetic valve manifold, when the electromagnetic valve-side connector unit is connected to the base-side connector unit, the electromagnetic valve-side connector unit may interfere with a section of the base around the insertion port. Therefore, there is a desire to improve the ease of mounting for electromagnetic valve manifolds.

Solution to Problem

In one general aspect, an electromagnetic valve manifold includes an electromagnetic valve including a solenoid unit, a control unit including a circuit board configured to control operation of the electromagnetic valve, and a base that includes the control unit. The electromagnetic valve includes an electromagnetic valve-side connector unit electrically connected to the solenoid unit. The base includes a base-side connector unit to which the electromagnetic valve-side connector unit is connected. The base-side connector unit is configured to electrically connect the electromagnetic valve-side connector unit and the circuit board to each other. The base includes an insertion port into which the electromagnetic valve-side connector unit is inserted. The base-side connector unit is disposed inside the insertion port. One of the electromagnetic valve or the base includes a protrusion. The other one of the electromagnetic valve or the base includes a recess. The recess is configured to guide the protrusion in a same direction as an insertion direction of the electromagnetic valve-side connector unit into the insertion port. When the protrusion is guided by the recess, the electromagnetic valve-side connector unit is inserted into the insertion port without interfering with a section of the base around the insertion port and is connected to the base-side connector unit.

DESCRIPTION OF EMBODIMENTS

An electromagnetic valve manifold according to one embodiment will now be described with reference to FIGS. 1 to 9.

Basic Configuration of Electromagnetic Valve Manifold

Figure 1:
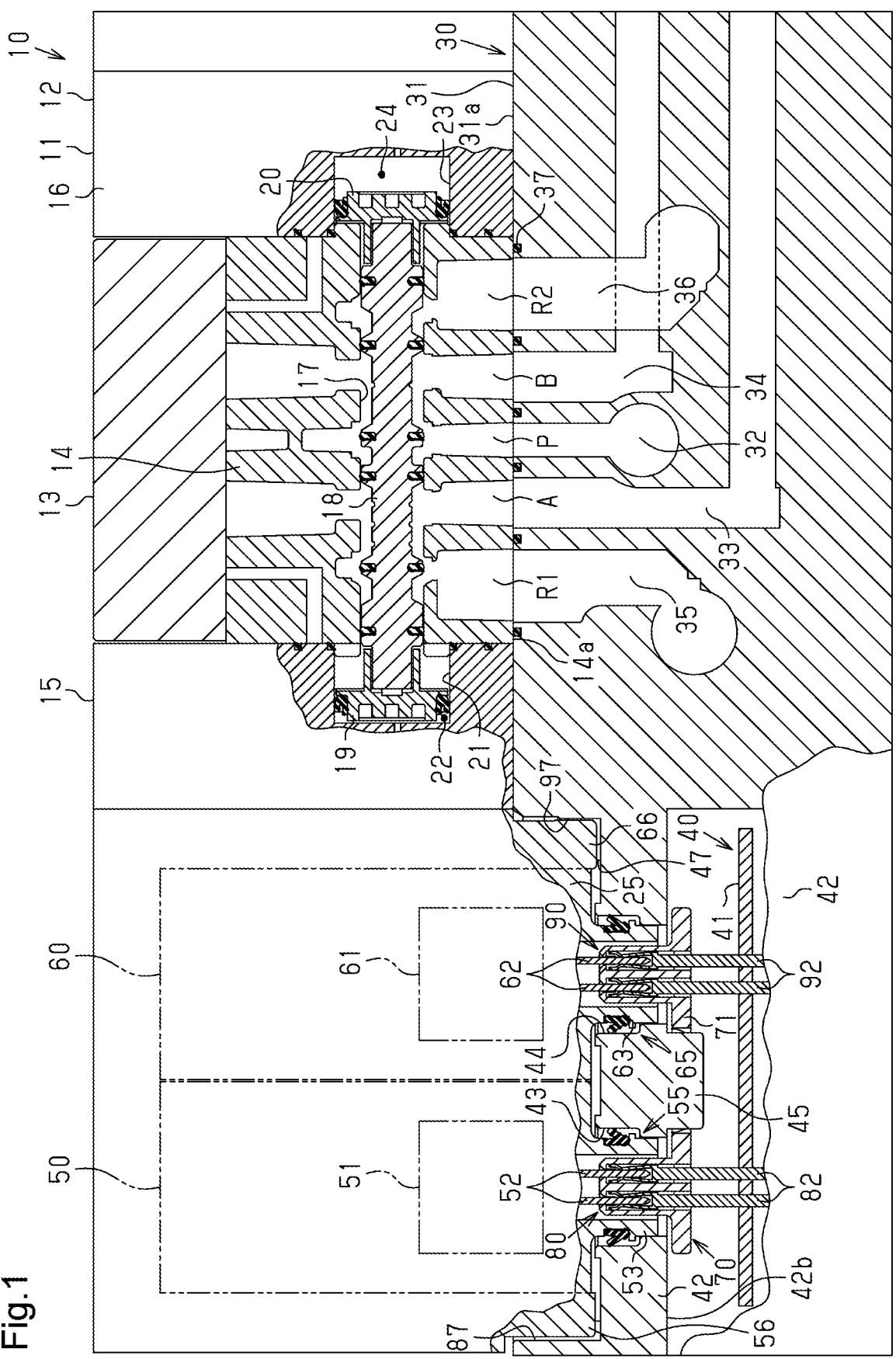
FIG. 1 is a cross-sectional view of an electromagnetic valve manifold according to one embodiment.

As shown in FIG. 1, an electromagnetic valve manifold 10 includes an electromagnetic valve 11. The electromagnetic valve 11 includes a main valve unit 12, a first pilot electromagnetic valve 50, and a second pilot electromagnetic valve 60. The electromagnetic valve 11 is a double-solenoid electromagnetic pilot valve. The electromagnetic valve manifold 10 includes a control unit 40 and a base 30.

The main valve unit 12 includes a valve casing 13. The valve casing 13 has the shape of an elongated rectangular block. The valve casing 13 includes a valve body 14, a first coupling block 15, and a second coupling block 16. The valve body 14 has the shape of an elongated rectangular block. The first coupling block 15 is coupled to a first end in the longitudinal direction of the valve body 14. The second coupling block 16 is coupled to a second end in the longitudinal direction of the valve body 14. The valve body 14 includes a base facing surface 14a, which faces the base 30.

The valve casing 13 includes a spool valve hole 17. The spool valve hole 17 is formed in the valve body 14. The spool valve hole 17 is a circular hole. The spool valve hole 17 extends in the longitudinal direction of the valve body 14. A first end of the spool valve hole 17 opens in a first end face in the longitudinal direction of the valve body 14. A second end of the spool valve hole 17 opens in a second end face in the longitudinal direction of the valve body 14. Thus, the spool valve hole 17 extends through the valve body 14 in the longitudinal direction.

The electromagnetic valve 11 includes a spool valve 18. The spool valve 18 is accommodated in the spool valve hole 17. The spool valve 18 is accommodated in the spool valve hole 17 with the axial direction of the spool valve 18 agreeing with the axial direction of the spool valve hole 17. The spool valve 18 is reciprocally accommodated in the spool valve hole 17.

The electromagnetic valve 11 includes a supply port P, a first output port A, a second output port B, a first discharge port R1, and a second discharge port R2. The electromagnetic valve 11 of the present embodiment is thus a five-port electromagnetic valve. The supply port P, the first output port A, the second output port B, the first discharge port R1, and the second discharge port R2 are formed in the valve body 14. The supply port P, the first output port A, the second output port B, the first discharge port R1, and the second discharge port R2 are each connected to the spool valve hole 17.

The first discharge port R1, the first output port A, the supply port P, the second output port B, and the second discharge port R2 are arranged in that order from the first end to the second end in the longitudinal direction of the valve body 14. First ends of the supply port P, the first output port A, the second output port B, the first discharge port R1, and the second discharge port R2 are each connected to the spool valve hole 17. Second ends of the supply port P, the first output port A, the second output port B, the first discharge port R1, and the second discharge port R2 each open in the base facing surface 14a of the valve body 14.

The electromagnetic valve 11 includes a first piston 19 and a second piston 20. The first piston 19 has the shape of a disc. The first piston 19 is coupled to a first end of the spool valve 18. The first piston 19 moves integrally with the spool valve 18. The second piston 20 has the shape of a disc. The second piston 20 is coupled to a second end of the spool valve 18. The second piston 20 moves integrally with the spool valve 18.

The first coupling block 15 includes a first piston accommodating recess 21, which is a circular hole. The first piston accommodating recess 21 accommodates the first piston 19, while allowing the first piston 19 to reciprocate. The first piston accommodating recess 21 and the first piston 19 define a first pilot pressure chamber 22. Pilot fluid is supplied to and discharged from the first pilot pressure chamber 22.

The second coupling block 16 includes a second piston accommodating recess 23, which is a circular hole. The second piston accommodating recess 23 accommodates the second piston 20, while allowing the second piston 20 to reciprocate. The second piston accommodating recess 23 and the second piston 20 define a second pilot pressure chamber 24. Pilot fluid is supplied to and discharged from the second pilot pressure chamber 24.

The base 30 includes a manifold block 31. The manifold block 31 has the shape of an elongated rectangular block. The manifold block 31 includes a placement surface 31a. The electromagnetic valve 11 is mounted on the placement surface 31a. The longitudinal direction of the manifold block 31 agrees with the longitudinal direction of the valve casing 13.

The manifold block 31 includes a supply passage 32, a first output passage 33, a second output passage 34, a first discharge passage 35, and a second discharge passage 36. The supply passage 32, the first output passage 33, the second output passage 34, the first discharge passage 35, and the second discharge passage 36 each include a first end portion that opens in the placement surface 31a and a second end portion opposite to the first end portion.

The first end portion of the supply passage 32 is connected to the supply port P. The first end portion of the first output passage 33 is connected to the first output port A. The first end portion of the second output passage 34 is connected to the second output port B. The first end portion of the first discharge passage 35 is connected to the first discharge port R1. The first end portion of the second discharge passage 36 is connected to the second discharge port R2.

The second end portion of the supply passage 32 is connected to a fluid supply source (not shown) via piping and the like. The second end portion of the first output passage 33 and the second end portion of the second output passage 34 are respectively connected to a fluid pressure device (not shown), for example, via pining and the like. The second end portion of the first discharge passage 35 and the second end portion of the second discharge passage 36 are connected to the atmosphere, for example, via piping and the like.

The electromagnetic valve manifold 10 includes an annular gasket 37. The gasket 37, for example, has the shape of a thin plate. The gasket 37 is disposed between the valve body 14 of the electromagnetic valve 11 and the manifold block 31. Thus, the gasket 37 is disposed between the electromagnetic valve 11 and the base 30. The gasket 37 provides a seal between the valve body 14 of the electromagnetic valve 11 and the manifold block 31.

Figure 2:
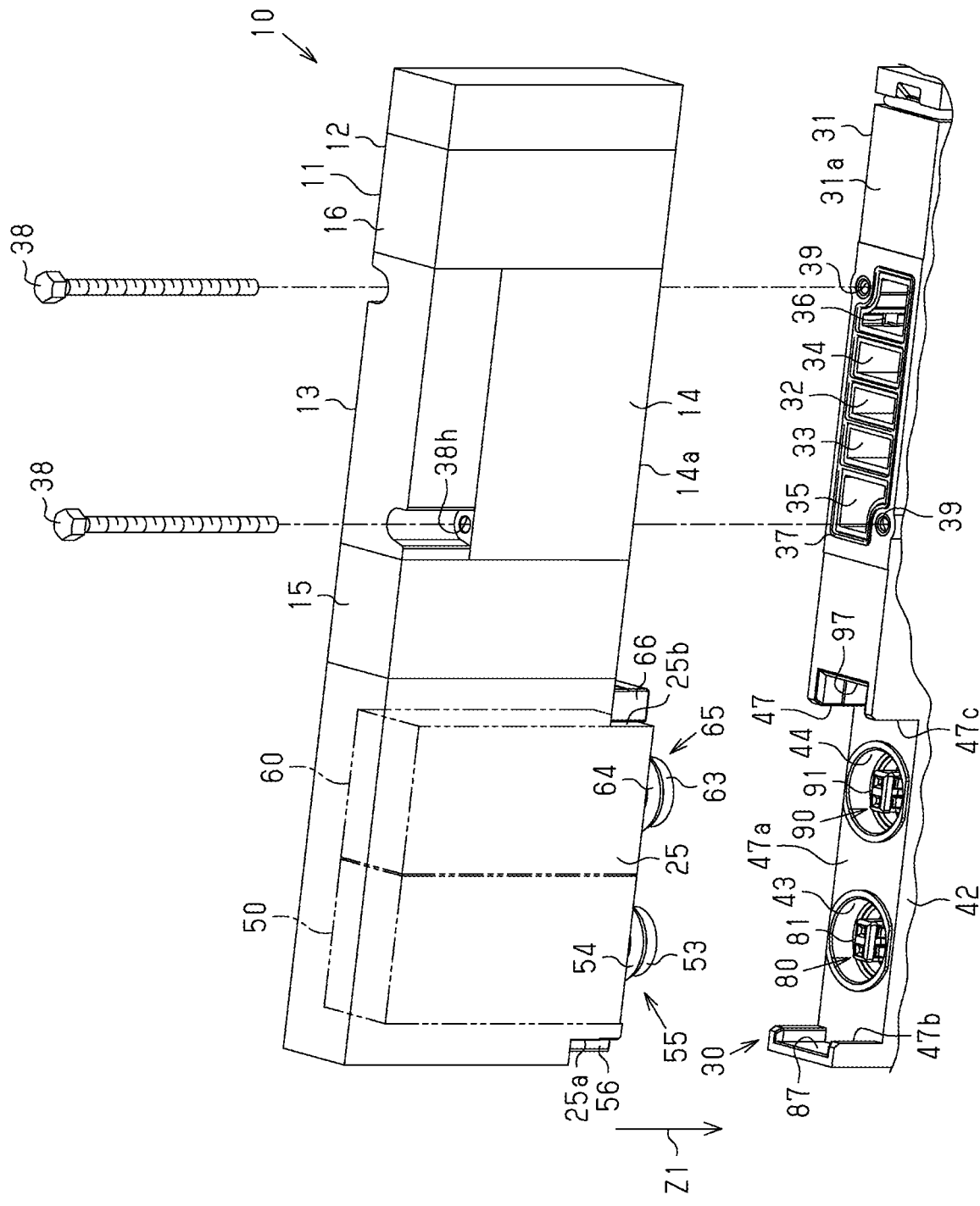
FIG. 2 is an exploded perspective view of an electromagnetic valve and a base of FIG. 1.

As shown in FIG. 2, the electromagnetic valve 11 is fixed to the base 30 with bolts 38. The valve casing 13 of the electromagnetic valve 11 includes two bolt insertion holes 38h, through which the bolts 38 are inserted. For illustrative purposes, only one of the bolt insertion holes 38h is shown in FIG. 2.

The base 30 includes internal thread holes 39. The bolts 38 are respectively threaded into the internal thread holes 39. Two internal thread holes 39 are formed in the placement surface 31a of the manifold block 31. The internal thread holes 39 are formed near the gasket 37 in the placement surface 31a of the manifold block 31. Each bolt 38 inserted into the corresponding bolt insertion hole 38h is fixed to the base 30 by being screwed into the corresponding internal thread hole 39 in a state in which the electromagnetic valve 11 is placed on the placement surface 31a.

As shown in FIG. 1, the control unit 40 is incorporated in the manifold block 31. The base 30 thus includes the control unit 40. The control unit 40 includes a circuit board 41. The circuit board 41 receives power from an external controller such as a programmable logic controller (PLC: not shown). The circuit board 41 is incorporated in the manifold block 31. The circuit board 41 controls operation of the first pilot electromagnetic valve 50 and the second pilot electromagnetic valve 60. The circuit board 41 thus controls operation of the electromagnetic valve 11.

The electromagnetic valve 11 includes a first solenoid unit 51 and a second solenoid unit 61, which are solenoid units. The first pilot electromagnetic valve 50 includes the first solenoid unit 51. The first pilot electromagnetic valve 50 supplies pilot fluid to and discharges pilot fluid from the first pilot pressure chamber 22. When voltage is applied to the first solenoid unit 51 from the circuit board 41, the first pilot electromagnetic valve 50 supplies compressed fluid from the fluid supply source (not shown), which is pilot fluid, to the first pilot pressure chamber 22. When the application of voltage to the first solenoid unit 51 from the circuit board 41 is stopped, the first pilot electromagnetic valve 50 stops the supply of fluid from the fluid supply source to the first pilot pressure chamber 22. The first pilot electromagnetic valve 50 discharges the pilot fluid in the first pilot pressure chamber 22 to the atmosphere.

The second pilot electromagnetic valve 60 includes a second solenoid unit 61. The second pilot electromagnetic valve 60 supplies pilot fluid to and discharges pilot fluid from the second pilot pressure chamber 24. When voltage is applied to the second solenoid unit 61 from the circuit board 41, the second pilot electromagnetic valve 60 supplies compressed fluid from the fluid supply source, which is pilot fluid, to the second pilot pressure chamber 24. When the application of voltage to the second solenoid unit 61 from the circuit board 41 is stopped, the second pilot electromagnetic valve 60 stops the supply of fluid from the fluid supply source to the second pilot pressure chamber 24. The second pilot electromagnetic valve 60 discharges the pilot fluid in the second pilot pressure chamber 24 to the atmosphere.

The spool valve 18 is switchable between a first position and a second position. For example, there may be a case in which voltage is applied to the first solenoid unit 51 from the circuit board 41, and voltage is not applied to the second solenoid unit 61 from the circuit board 41. In this case, the first pilot electromagnetic valve 50 supplies compressed fluid, which is pilot fluid, from the fluid supply source to the first pilot pressure chamber 22. On the other hand, the second pilot electromagnetic valve 60 discharges the pilot fluid in the second pilot pressure chamber 24 to the atmosphere. Accordingly, the spool valve 18 moves toward the second piston accommodating recess 23. As a result, the spool valve 18 is switched to the first position, in which the supply port P is connected to the first output port A, and the second output port B is connected to the second discharge port R2. Also, when the spool valve 18 is switched to the first position, the supply port P and the second output port B are disconnected from each other, and the first output port A and the first discharge port R1 are disconnected from each other. Accordingly, the fluid supplied to the supply port P flows to the fluid pressure device via the first output port A, and the first output passage 33. Then, the pressurized fluid from the fluid pressure device flows toward the second discharge passage 36 via the second output passage 34, the second output port B, and the second discharge port R2 to be discharged to the outside.

Also, for example, there may be a case in which voltage is not applied to the first solenoid unit 51 from the circuit board 41, and voltage is applied to the second solenoid unit 61 from the circuit board 41. In this case, the second pilot electromagnetic valve 60 supplies compressed fluid, which is pilot fluid, from the fluid supply source to the second pilot pressure chamber 24. On the other hand, the first pilot electromagnetic valve 50 discharges the pilot fluid in the first pilot pressure chamber 22 to the atmosphere. Accordingly, the spool valve 18 moves toward the first piston accommodating recess 21. As a result, the spool valve 18 is switched to the second position, in which the supply port P is connected to the second output port B, and the first output port A is connected to the first discharge port R1. Also, when the spool valve 18 is switched to the second position, the supply port P and the first output port A are disconnected from each other, and the second output port B and the second discharge port R2 are disconnected from each other. Accordingly, the fluid supplied to the supply port P flows to the fluid pressure device via the second output port B, and the second output passage 34. Then, the pressurized fluid from the fluid pressure device flows toward the first discharge passage 35 via the first output passage 33, the first output port A, and the first discharge port R1 to be discharged to the outside.

In this manner, the first pilot electromagnetic valve 50 supplies pilot fluid to and discharges pilot fluid from the first pilot pressure chamber 22, and the second pilot electromagnetic valve 60 supplies pilot fluid to and discharges pilot fluid from the second pilot pressure chamber 24. Accordingly, the spool valve 18 reciprocates in the spool valve hole 17 between the first position and the second position. The connection state among the ports is switched as the spool valve 18 is switched between the first position and the second position. Thus, the main valve unit 12 supplies pilot fluid to and discharges pilot fluid from each of the first pilot pressure chamber 22 and the second pilot pressure chamber 24, thereby switching the connections among the ports. FIG. 1 shows a state in which the spool valve 18 is located at the second position.

The first pilot electromagnetic valve 50 and the second pilot electromagnetic valve 60 are integrated and arranged side by side. Specifically, the first pilot electromagnetic valve 50 and the second pilot electromagnetic valve 60 are located on a side of the first coupling block 15 that is opposite to the valve body 14. The first pilot electromagnetic valve 50 and the second pilot electromagnetic valve 60 are arranged side by side with the first coupling block 15. The first pilot electromagnetic valve 50 and the second pilot electromagnetic valve 60 are integrated with the first coupling block 15. Therefore, the first pilot electromagnetic valve 50 and the second pilot electromagnetic valve 60 are integrated with the main valve unit 12.

The electromagnetic valve 11 includes a projecting portion 25. The projecting portion 25 is a portion of the electromagnetic valve 11 that projects further toward the base 30 than the base facing surface 14a of the valve body 14. The projecting portion 25 includes a part of the first pilot electromagnetic valve 50 and a part of the second pilot electromagnetic valve 60.

As shown in FIG. 2, the projecting portion 25 includes a first side surface 25a and a second side surface 25b. The first side surface 25a and the second side surface 25b are located at opposite ends of the projecting portion 25 in the arrangement direction of the first pilot electromagnetic valve 50 and the second pilot electromagnetic valve 60. The first side surface 25a is a side surface of the first pilot electromagnetic valve 50. The second side surface 25b is a side surface of the second pilot electromagnetic valve 60. The first side surface 25a and the second side surface 25b protrude further toward the base 30 than the base facing surface 14a.

Electromagnetic Valve-Side Connector Unit

Figure 3:
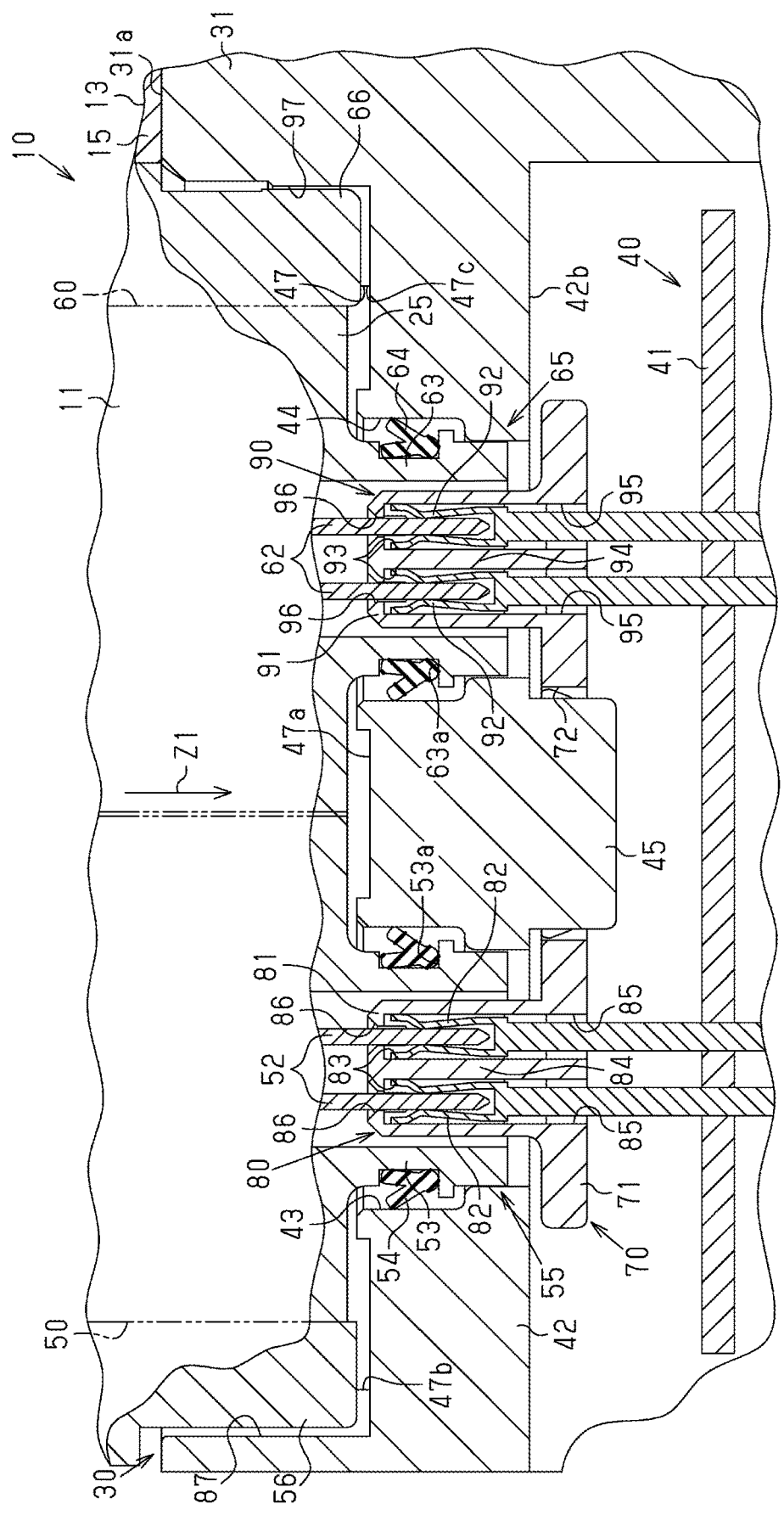
FIG. 3 is an enlarged partial cross-sectional view of the electromagnetic valve manifold shown in FIG. 1.

As shown in FIG. 3, the electromagnetic valve 11 includes a first electromagnetic valve-side connector unit 55 and a second electromagnetic valve-side connector unit 65, which are electromagnetic valve-side connector units. The first pilot electromagnetic valve 50 includes the first electromagnetic valve-side connector unit 55. The first electromagnetic valve-side connector unit 55 includes first conductive members 52, which are conductive members, and a first tubular portion 53, which is a tubular portion. The first conductive members 52 are electrically connected to the first solenoid unit 51. The first pilot electromagnetic valve 50 includes two first conductive members 52. One of the two first conductive members 52 forms a positive electrode line, and the other one of the two first conductive members 52 forms a negative electrode line. Each first conductive member 52 is, for example, columnar.

The first tubular portion 53 surrounds the two first conductive members 52. Specifically, the first tubular portion 53 surrounds the distal end portions, which are the end portions of the two first conductive members 52 on the side opposite to the first solenoid unit 51. The first tubular portion 53 is cylindrical. The distal end of each first conductive member 52 is located inside the first tubular portion 53. The axial direction of the first tubular portion 53 is the same as the extending direction of the distal end portion of each first conductive member 52. The first pilot electromagnetic valve 50 is arranged with respect to the base 30 such that the opening of the first tubular portion 53 faces the base 30. Thus, the distal end portion of each first conductive member 52 extends toward the base 30. The first conductive members 52 and the first tubular portion 53 project from the distal end face of the projecting portion 25.

The first tubular portion 53 includes a first attachment groove 53*a* in the outer circumferential surface. The first attachment groove 53*a* is annular. A first lip packing 54 is attached to the first attachment groove 53*a*. The first lip packing 54 is made of rubber. The first lip packing 54 is circular and annular.

The second pilot electromagnetic valve 60 includes a second electromagnetic valve-side connector unit 65. The second electromagnetic valve-side connector unit 65 includes second conductive members 62, which are conductive members, and a second tubular portion 63, which is a tubular portion. The second conductive members 62 are electrically connected to the second solenoid unit 61. The second pilot electromagnetic valve 60 includes two second conductive members 62. One of the two second conductive members 62 forms a positive electrode line, and the other one of the two second conductive members 62 forms a negative electrode line. Each second conductive member 62 is, for example, columnar.

The second tubular portion 63 surrounds the two second conductive members 62. Specifically, the second tubular portion 63 surrounds the distal end portions, which are the end portions of the two second conductive members 62 on the side opposite to the second solenoid unit 61. The second tubular portion 63 is cylindrical. The distal end of each second conductive member 62 is located inside the second tubular portion 63. The axial direction of the second tubular portion 63 is the same as the extending direction of the distal end portion of each second conductive member 62. The second pilot electromagnetic valve 60 is arranged with respect to the base 30 such that the opening of the second tubular portion 63 faces the base 30. Thus, the distal end portion of each second conductive member 62 extends toward the base 30. The second conductive members 62 and the second tubular portion 63 project from the distal end face of the projecting portion 25.

The axial direction of the second tubular portion 63 is the same as the axial direction of the first tubular portion 53. The extending direction of the distal end portion of each second conductive member 62 is the same as the extending direction of the distal end portion of each first conductive member 52. The first tubular portion 53 and the second tubular portion 63 are arranged side by side in the arrangement direction of the first pilot electromagnetic valve 50 and the second pilot electromagnetic valve 60. Therefore, the arrangement direction of the first electromagnetic valve-side connector unit 55 and the second electromagnetic valve-side connector unit 65 is the same as the arrangement direction of the first pilot electromagnetic valve 50 and the second pilot electromagnetic valve 60.

The second tubular portion 63 includes a second attachment groove 63*a* in the outer circumferential surface. The second attachment groove 63*a* is annular. A second lip packing 64 is attached to the second attachment groove 63*a*. The second lip packing 64 is made of rubber. The second lip packing 64 is circular and annular.

Base-Side Connector Unit

The electromagnetic valve manifold 10 includes a connector member 70. The connector member 70 is disposed in the base 30. The connector member 70 includes a base portion 71. The connector member 70 includes a first base-side connector unit 80 and a second base-side connector unit 90, which are base-side connector units. Therefore, the base 30 includes the first base-side connector unit 80 and the second base-side connector unit 90, which are base-side connector units. The connector member 70 is formed by integrating the first base-side connector unit 80 and the second base-side connector unit 90 with the base portion 71.

Figure 4:
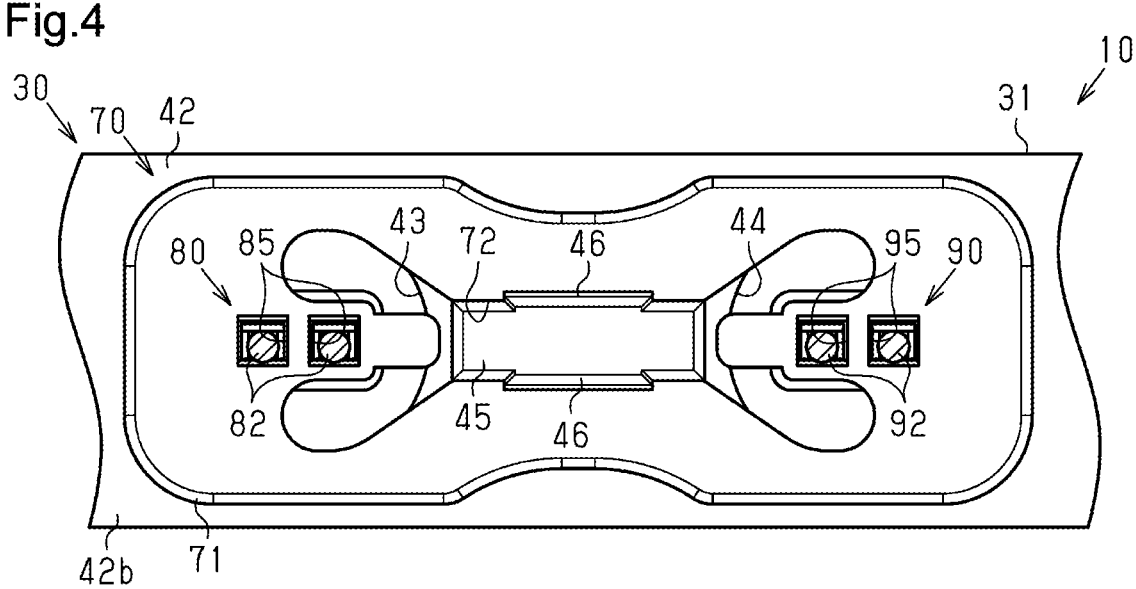
FIG. 4 is a cross-sectional view illustrating a state in which the connector member shown in FIG. 3 is attached to the base.

As shown in FIG. 4, the base portion 71 has the shape of a flat plate. Specifically, the base portion 71 has the shape of a thin plate. The base portion 71 is made of plastic. The base portion 71 has the shape of an elongated rectangular plate in plan view in the thickness direction of the base portion 71. The base portion 71 includes a through-hole 72. The through-hole 72 extends through the base portion 71 in the thickness direction. The through-hole 72 is located in a center portion of the base portion 71. In plan view in the thickness direction of the base portion 71, the through-hole 72 has the shape of an elongated rectangular hole. The longitudinal direction of the through-hole 72 is the same as the longitudinal direction of the base portion 71.

As shown in FIG. 3, the first base-side connector unit 80 includes a first terminal accommodating portion 81 and first connection terminals 82. The first terminal accommodating portion 81 is tubular and projects from the base portion 71. The first terminal accommodating portion 81 includes two first terminal accommodating chambers 83. The two first terminal accommodating chambers 83 are arranged in a direction orthogonal to the axial direction of the first terminal accommodating portion 81. The two first terminal accommodating chambers 83 are spaced apart from each other by a first partition wall 84, which is part of the first terminal accommodating portion 81. Each first terminal accommodating chamber is open in a surface of the base portion 71 on a side opposite to the first terminal accommodating portion 81 through a corresponding first terminal insertion hole 85 formed in the base portion 71. The first terminal accommodating portion 81 includes two first conductive member insertion holes 86 in a distal end face. Each first terminal accommodating chamber 83 opens in the distal end face of the first terminal accommodating portion 81 via the corresponding first conductive member insertion hole 86.

The first base-side connector unit 80 includes two first connection terminals 82. The two first connection terminals 82 are respectively accommodated in the corresponding first terminal accommodating chambers 83. Each first conductive member 52, which is inserted into the corresponding first terminal accommodating chamber 83 through the corresponding first conductive member insertion hole 86, can be inserted into and connected to one of the first connection terminals 82. Thus, each first connection terminal 82 is accommodated in the corresponding first terminal accommodating chamber 83 such that the first conductive member 52, which is inserted into the first terminal accommodating chamber 83 through the first conductive member insertion hole 86, can be inserted into and connected to the first connection terminal 82. In this manner, each first conductive member 52 is connected to the first base-side connector unit 80.

Also, the end of each first connection terminal 82 on the side opposite to the first conductive member 52 is electrically connected to the circuit board 41 via the corresponding first terminal insertion hole 85. Thus, each first connection terminal 82 electrically connects the corresponding first conductive member 52 and the circuit board 41 to each other. Therefore, the first base-side connector unit 80, to which the first electromagnetic valve-side connector unit 55 is connected, electrically connects the first electromagnetic valve-side connector unit 55 and the circuit board 41 to each other.

The second base-side connector unit 90 includes a second terminal accommodating portion 91 and second connection terminals 92. The second terminal accommodating portion 91 is tubular and projects from the base portion 71. The second terminal accommodating portion 91 includes two second terminal accommodating chambers 93. The two second terminal accommodating chambers 93 are arranged in a direction orthogonal to the axial direction of the second terminal accommodating portion 91. The two second terminal accommodating chambers 93 are spaced apart from each other by a second partition wall 94, which is part of the second terminal accommodating portion 91. Each second terminal accommodating chamber is open in a surface of the base portion 71 on a side opposite to the second terminal accommodating portion 91 through a corresponding second terminal insertion hole 95 formed in the base portion 71. The second terminal accommodating portion 91 includes two second conductive member insertion holes 96 in a distal end face. Each second terminal accommodating chamber 93 opens in the distal end face of the second terminal accommodating portion 91 via the corresponding second conductive member insertion hole 96.

The second base-side connector unit 90 includes two second connection terminals 92. The two second connection terminals 92 are respectively accommodated in the corresponding second terminal accommodating chambers 93. Each second conductive member 62, which is inserted into the corresponding second terminal accommodating chamber 93 through the corresponding second conductive member insertion hole 96, can be inserted into and connected to one of the second connection terminals 92. Thus, each second connection terminal 92 is accommodated in the corresponding second terminal accommodating chamber 93 such that the second conductive member 62, which is inserted into the second terminal accommodating chamber 93 through the second conductive member insertion hole 96, can be inserted into and connected to the second connection terminal 92. In this manner, each second conductive member 62 is connected to the second base-side connector unit 90.

The end of each second connection terminal 92 on the side opposite to the second conductive member 62 is electrically connected to the circuit board 41 via the second terminal insertion hole 95. Thus, each second connection terminal 92 electrically connects the corresponding second conductive member 62 and the circuit board 41 to each other. Therefore, the second base-side connector unit 90, to which the second electromagnetic valve-side connector unit 65 is connected, electrically connects the second electromagnetic valve-side connector unit 65 and the circuit board 41 to each other.

As shown in FIG. 2, the base 30 includes a fitting recess 47. The fitting recess 47 is formed in the placement surface 31a. The projecting portion 25 can be fitted in the fitting recess 47. The fitting recess 47 includes a bottom surface 47a, a first inner side surface 47b, and a second inner side surface 47c. The bottom surface 47a is flat. The bottom surface 47a extends parallel to the placement surface 31a. The first inner side surface 47b and the second inner side surface 47c extend in a direction orthogonal to the bottom surface 47a. The first inner side surface 47b and the second inner side surface 47c extend from the bottom surface 47a. The first inner side surface 47b and the second inner side surface 47c are continuous with the placement surface 31a. The first inner side surface 47b and the second inner side surface 47c connect the bottom surface 47a and the placement surface 31a to each other. The first inner side surface 47b faces the first side surface 25a of the projecting portion 25. The second inner side surface 47c faces the second side surface 25b of the projecting portion 25.

As shown in FIG. 3, the base 30 includes an attachment wall portion 42. The connector member 70 is attached to the attachment wall portion 42. The outer surface of the attachment wall portion 42 is the bottom surface 47a of the fitting recess 47. The inner surface of the attachment wall portion 42 is an attachment surface 42b on a side opposite to the bottom surface 47a of the fitting recess 47. The connector member 70 is attached to the attachment surface 42b. The attachment surface 42b is flat.

The base 30 includes a first insertion port 43, which is an insertion port. The first insertion port 43 extends through the attachment wall portion 42. The first insertion port 43 opens in the bottom surface 47a of the fitting recess 47. The first terminal accommodating portion 81 is disposed inside the first insertion port 43. Therefore, the first base-side connector unit 80 is disposed inside the first insertion port 43. The first tubular portion 53 is inserted into the first insertion port 43. Therefore, the first electromagnetic valve-side connector unit 55 is inserted into the first insertion port 43. The first terminal accommodating portion 81 is inserted into the first tubular portion 53. Therefore, the first base-side connector unit 80 is inserted into the first tubular portion 53. The first lip packing 54 is provided between the outer circumferential surface of the first tubular portion 53 and the inner circumferential surface of the first insertion port 43. The first lip packing 54 provides a seal between the first tubular portion 53 and the first insertion port 43.

The base 30 includes a second insertion port 44, which is an insertion port. The second insertion port 44 extends through the attachment wall portion 42. The second insertion port 44 opens in the bottom surface 47a of the fitting recess 47. The first insertion port 43 and the second insertion port 44 are arranged side by side in the arrangement direction of the first pilot electromagnetic valve 50 and the second pilot electromagnetic valve 60. Therefore, the arrangement direction of the first insertion port 43 and the second insertion port 44 is the same as the arrangement direction of the first pilot electromagnetic valve 50 and the second pilot electromagnetic valve 60.

The second terminal accommodating portion 91 is disposed inside the second insertion port 44. Therefore, the second base-side connector unit 90 is disposed inside the second insertion port 44. The second tubular portion 63 is inserted into the second insertion port 44. Therefore, the second electromagnetic valve-side connector unit 65 is inserted into the second insertion port 44. The second terminal accommodating portion 91 is inserted into the second tubular portion 63. Therefore, the second base-side connector unit 90 is inserted into the second tubular portion 63. The second lip packing 64 is provided between the outer circumferential surface of the second tubular portion 63 and the inner circumferential surface of the second insertion port 44. The second lip packing 64 provides a seal between the second tubular portion 63 and the second insertion port 44.

The base 30 includes a projecting wall 45. The projecting wall 45 is columnar. The projecting wall 45 projects from the attachment wall portion 42. In plan view in the thickness direction of the base portion 71, the projecting wall 45 has the shape of an elongated rectangle as shown in FIG. 4. The base 30 includes two engagement projections 46. The two engagement projections 46 respectively project from the projecting wall 45. A section of the base portion 71 around the through-hole 72 can be engaged with the two engagement projections 46.

The base portion 71 is elastically deformable when the two engagement projections 46 are inserted into the through-hole 72. Specifically, when the two engagement projections 46 are inserted into the through-hole 72, the section of the base portion 71 around the through-hole 72 is easily elastically deformed in the traverse direction of the base portion 71. When the two engagement projections 46 pass through the through-hole 72, the section of the base portion 71 around the through-hole 72 returns to its original shape before the elastic deformation. The section of the base portion 71 around the through-hole 72 is engaged with the two engagement projections 46.

In this manner, the connector member 70 is attached to the base 30 by engaging the section of the base portion 71 around the through-hole 72 with the two engagement projections 46. In a state in which the connector member 70 is attached to the base 30, the connector member 70 is allowed to move slightly in the longitudinal direction and the traverse direction of the base portion 71.

As shown in FIG. 3, when the first tubular portion 53 is inserted into the first insertion port 43, each first conductive member 52 is inserted into the first terminal accommodating chamber 83 via the first conductive member insertion hole 86 to be inserted into and connected to the corresponding first connection terminal 82. In this manner, the first electromagnetic valve-side connector unit 55 is connected to the first base-side connector unit 80. Also, when the second tubular portion 63 is inserted into the second insertion port 44, each second conductive member 62 is inserted into the second terminal accommodating chamber 93 via the second conductive member insertion hole 96 to be inserted into and connected to the corresponding second connection terminal 92. In this manner, the second electromagnetic valve-side connector unit 65 is connected to the second base-side connector unit 90.

The insertion direction of the first electromagnetic valve-side connector unit 55 into the first insertion port 43 is the same as the insertion direction of the second electromagnetic valve-side connector unit 65 into the second insertion port 44. In the following description, the insertion direction of the first electromagnetic valve-side connector unit 55 into the first insertion port 43 and the insertion direction of the second electromagnetic valve-side connector unit 65 into the second insertion port 44 will be simply referred to as an insertion direction Z1 in some cases.

Protrusions and Recesses

Figure 5:
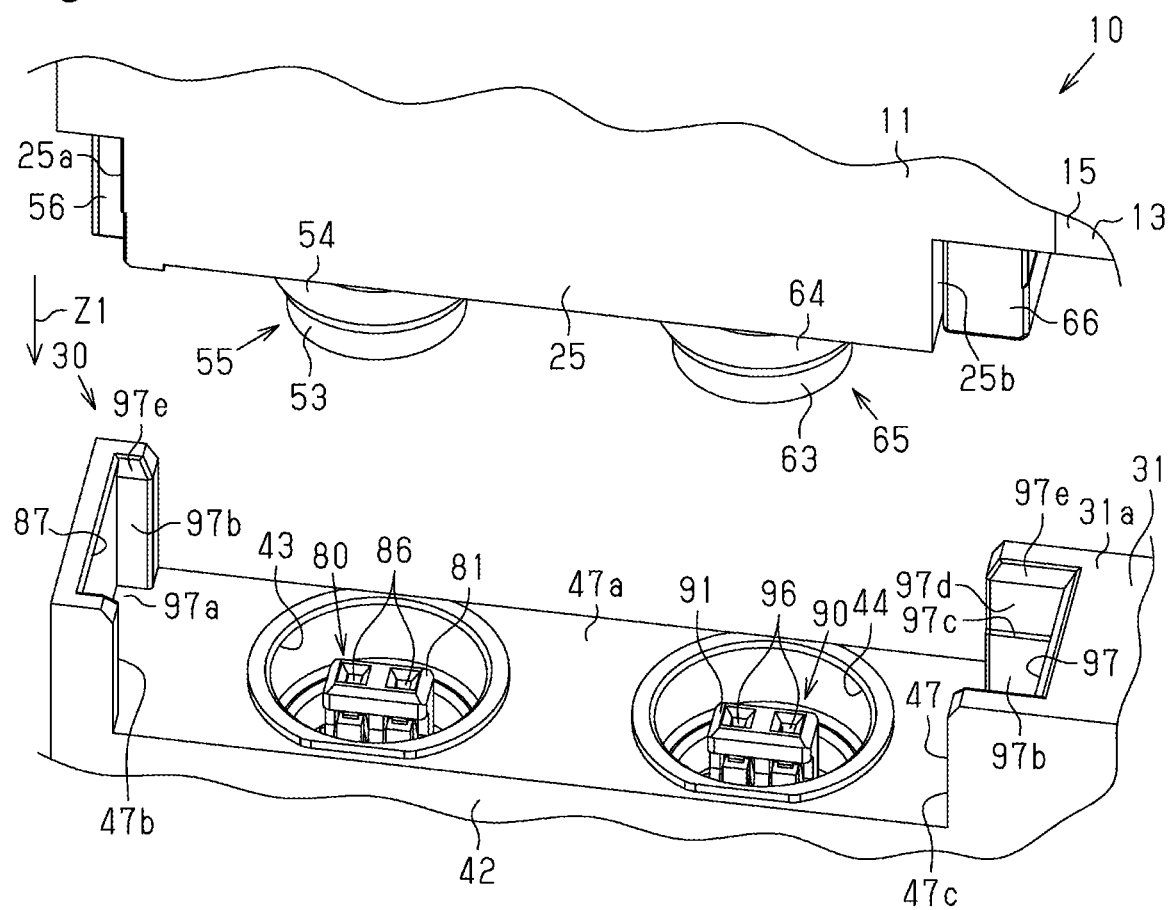
FIG. 5 is an enlarged exploded perspective view showing part of the electromagnetic valve and the base shown in FIG. 2.

As shown in FIG. 5, the electromagnetic valve 11 includes a first protrusion 56 and a second protrusion 66, which are protrusions. The first protrusion 56 and the second protrusion 66 are provided on the projecting portion 25. The first protrusion 56 protrudes from the first side surfaces 25a of the projecting portion 25. The second protrusion 66 protrudes from the second side surface 25b of the projecting portion 25. The first protrusion 56 and the second protrusion 66 each have the shape of a quadrangular prism and extend in the insertion direction Z1. An end face of each of the first protrusion 56 and the second protrusion 66 that faces the base 30 protrudes further than the distal end face of the projecting portion 25.

Figure 6:
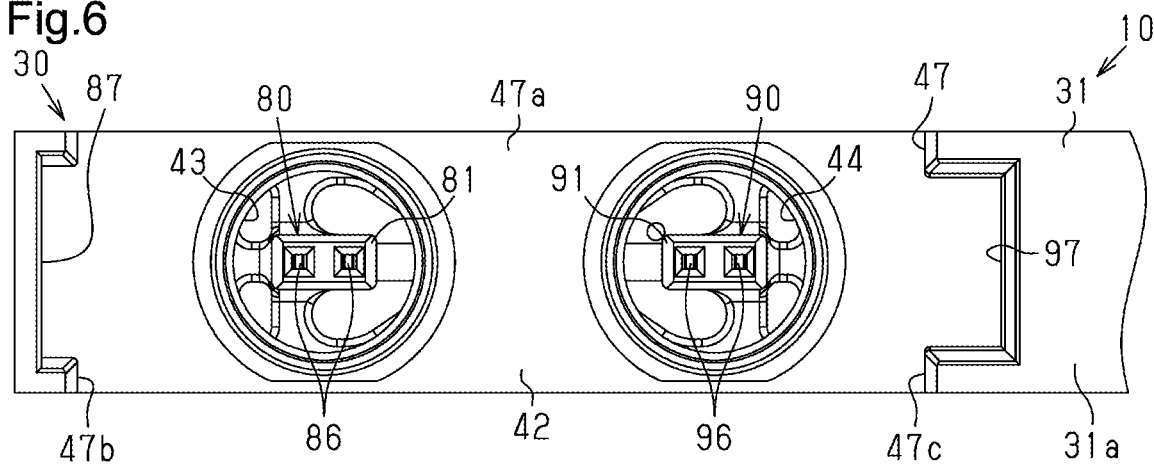
FIG. 6 is a plan view showing a part of the base shown in FIG. 5.

As shown in FIGS. 5 and 6, the base 30 includes a first recess 87 and a second recess 97, which are recesses. The first recess 87 is formed in the first inner side surface 47b. The first recess 87 opens in the first inner side surface 47b and the placement surface 31a. The first protrusion 56 is inserted into the first recess 87. The insertion direction of the first protrusion 56 into the first recess 87 is the same as the insertion direction Z1. The first recess 87 guides the first protrusion 56 in the same direction as the insertion direction Z1. The first recess 87 includes a first open end, which opens in the placement surface 31a, and a first closed end, which is located on a side opposite to the first open end, in the insertion direction of the first protrusion 56 into the first recess 87. The first open end is a receiving port that receives the first protrusion 56.

The second recess 97 is formed in the second inner side surface 47c. The second recess 97 opens in the second inner side surface 47c and the placement surface 31a. The second protrusion 66 is inserted into the second recess 97. The insertion direction of the second protrusion 66 into the second recess 97 is the same as the insertion direction Z1. The second recess 97 guides the second protrusion 66 in the same direction as the insertion direction Z1. The second recess 97 includes a second open end, which opens in the placement surface 31a, and a second closed end, which is located on a side opposite to the second open end, in the insertion direction of the second protrusion 66 into the second recess 97. The second open end is a receiving port that receives the second protrusion 66.

Figure 7:
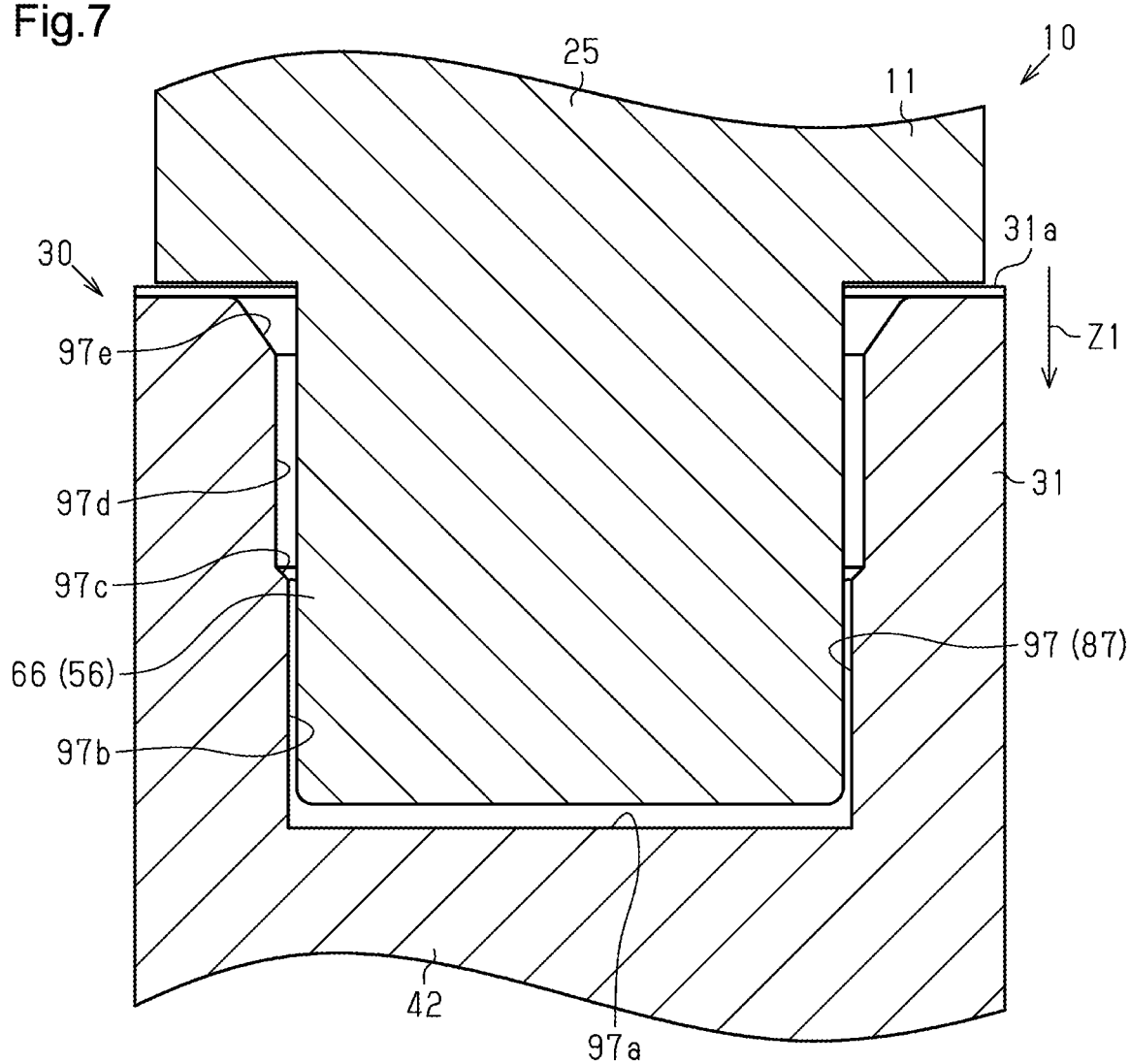
FIG. 7 is an enlarged cross-sectional view showing part of the electromagnetic valve and the base shown in FIG. 5.

As shown in FIG. 7, the second recess 97 includes a bottom surface 97a, first straight surfaces 97b, first tapered surfaces 97c, second straight surfaces 97d, and second tapered surfaces 97e. The bottom surface 97a is a surface of the second recess 97 that is located at the innermost position in the insertion direction of the second protrusion 66 into the second recess 97. The bottom surface 97a is located at the second closed end of the second recess 97. The bottom surface 97a is continuous with the bottom surface 47a of the fitting recess 47. The bottom surface 97a is located on the same plane as the bottom surface 47a of the fitting recess 47.

The first straight surfaces 97b are continuous with the bottom surface 97a. The first straight surfaces 97b extend in a direction orthogonal to the bottom surface 97a. The first straight surfaces 97b extend along side surfaces of the second protrusion 66. The first tapered surfaces 97c, which are first inclined surfaces, are continuous with edges of the first straight surfaces 97b on a side opposite to the bottom surface 97a. The first tapered surfaces 97c are inclined such that the width of the second recess 97 is larger at any position further from the first straight surfaces 97b than at a position closer to the first straight surfaces 97*b*. The width of the second recess 97 is the dimension in the left-right direction as viewed in FIG. 7. The second straight surfaces 97*d* are continuous with edges of the first tapered surfaces 97*c* on a side opposite to the first straight surfaces 97*b*. The second straight surfaces 97*d* extend parallel to the first straight surfaces 97*b*.

The second tapered surfaces 97*e*, which are second inclined surfaces, are continuous with edges of the second straight surfaces 97*d* on a side opposite to the first tapered surfaces 97*c*. The second tapered surfaces 97*e* are inclined such that the width of the second recess 97 is larger at any position further from the second straight surfaces 97*d* than at a position closer to the second straight surfaces 97*d*. The second tapered surfaces 97*e* are continuous with the placement surface 31*a*. The second tapered surfaces 97*e* are surfaces of the second recess 97 that are closest to the receiving port in the insertion direction of the second protrusion 66 into the second recess 97. The second recess 97 includes a receiving port, which receives the second protrusion 66, and a portion other than the receiving port. The portion other than the receiving port is an inner section that is located further inward than the receiving port in the insertion direction of the second protrusion 66 into the second recess 97. The second recess 97 has a larger width at the receiving port than at the inner section. The second recess 97 includes a wide portion and a narrow portion. The wide portion includes the receiving port (the second open end). The narrow portion is a section other than the wide portion and has a smaller width than that of the wide portion. For example, the wide portion corresponds to the second tapered surfaces 97*e*, and the narrow portion corresponds to the section other than the second tapered surfaces 97*e*.

The relationship between the first protrusion 56 and the first recess 87 is substantially the same as the relationship between the second protrusion 66 and the second recess 97. Therefore, as in the case of the second recess 97, the first recess 87 has a width larger at the receiving port than at other sections. The first recess 87 includes a wide portion and a narrow portion. The wide portion includes the receiving port (the first open end). The narrow portion is a section other than the wide portion and has a smaller width than that of the wide portion. In FIG. 7, the same reference numerals are given to common components, and detailed explanation of the relationship between the first protrusion 56 and the first recess 87 will be omitted. For example, the first recess 87 of the present embodiment does not include the first tapered surfaces 97*c* or the second straight surfaces 97*d* as shown in FIG. 5, but may include the first tapered surfaces 97*c* and the second straight surfaces 97*d*.

Figure 8:
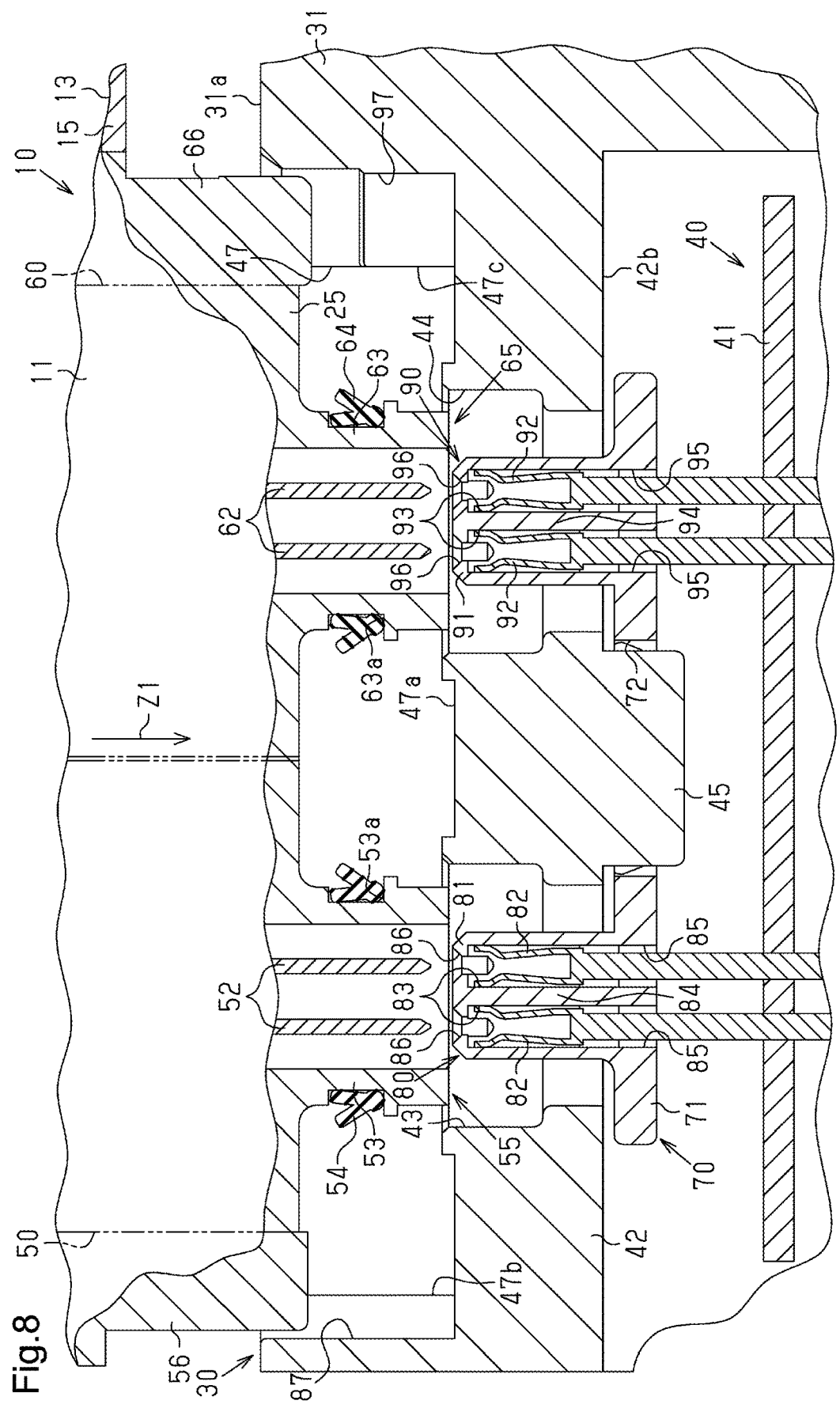
FIG. 8 is a cross-sectional view showing a state before the electromagnetic valve shown in FIG. 3 is mounted to the base.
Figure 9:
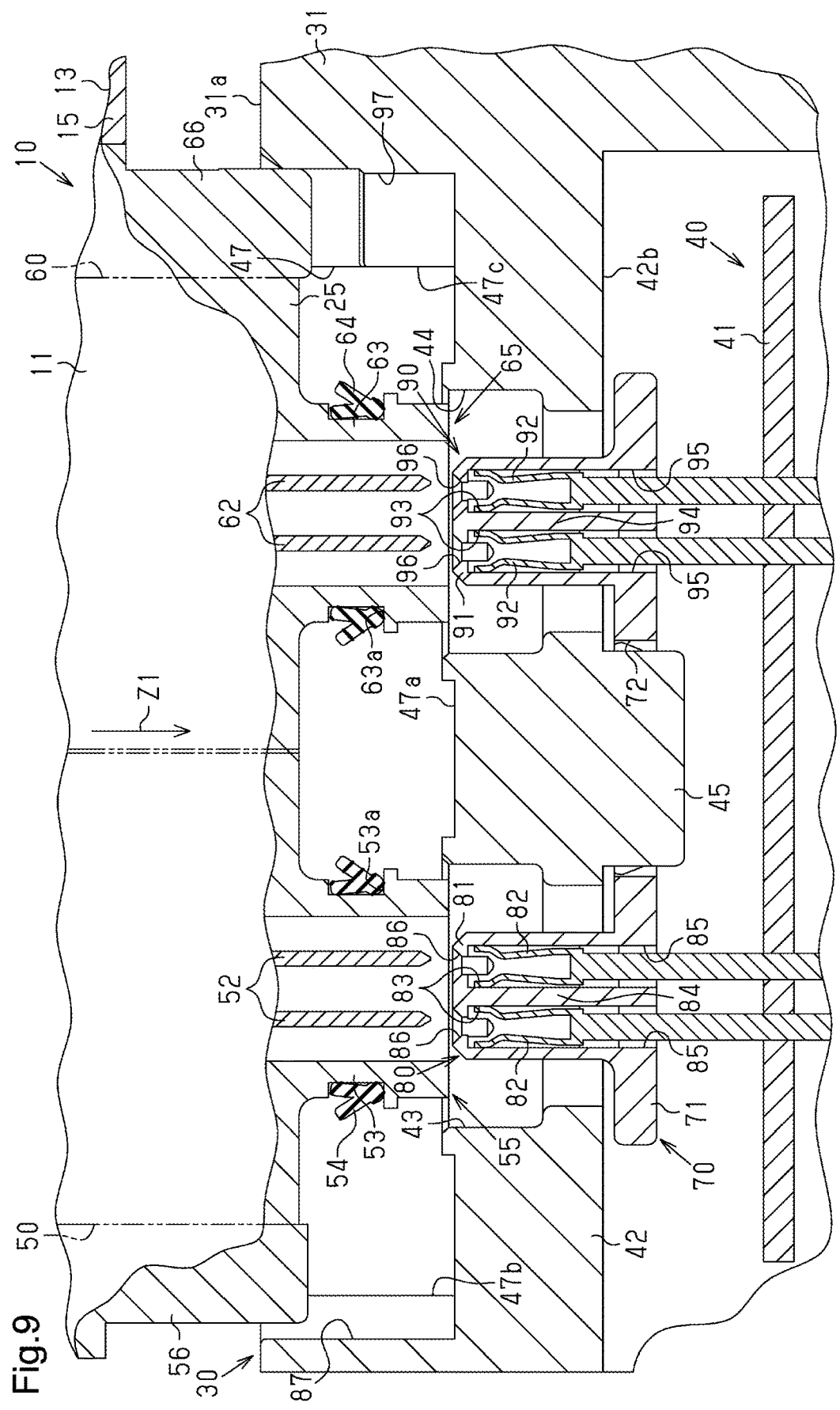
FIG. 9 is a cross-sectional view showing a state before the electromagnetic valve shown in FIG. 3 is mounted to the base.

As shown in FIGS. 8 and 9, when the electromagnetic valve 11 is mounted to the base 30, the first protrusion 56 is guided by the first recess 87, and the second protrusion 66 is guided by the second recess 97. When the first protrusion 56 is inserted into the receiving port of the first recess 87 and the second protrusion 66 is inserted into the receiving port of the second recess 97, the first tubular portion 53 has not been inserted into the first insertion port 43, and the second tubular portion 63 has not been inserted into the second insertion port 44. Therefore, the first protrusion 56 and the second protrusion 66 are designed to be inserted into the first recess 87 and the second recess 97 before the first tubular portion 53 and the second tubular portion 63 are inserted into the first insertion port 43 and the second insertion port 44, respectively. Then, when the first protrusion 56 is guided to a section further inward than the receiving port in the first recess 87 and the second protrusion 66 is guided to a section further inward than the receiving port in the second recess 97, the first tubular portion 53 is inserted into the first insertion port 43, and the second tubular portion 63 is inserted into the second insertion port 44. For example, when the distal end portions of the first and second protrusions 56, 66 in the insertion direction pass through the wide portions (the second tapered surfaces 97*e*) of the first and second recesses 87, 97, the first and second tubular portions 53, 63 start to be inserted into the first and second insertion ports 43, 44.

For example, as shown in FIG. 9, the first protrusion 56 is not in contact with the first recess 87 in a state in which the second protrusion 66 is in contact with the second recess 97. At this time, the first tubular portion 53 is inserted into the first insertion port 43 without interfering with a section of the base 30 around the first insertion port 43, and the second tubular portion 63 is inserted into the second insertion port 44 without interfering with a section of the base 30 around the second insertion port 44. Also, the second protrusion 66 is not in contact with the second recess 97 in a state in which the first protrusion 56 is in contact with the first recess 87. At this time also, the first tubular portion 53 is inserted into the first insertion port 43 without interfering with a section of the base 30 around the first insertion port 43, and the second tubular portion 63 is inserted into the second insertion port 44 without interfering with a section of the base 30 around the second insertion port 44.

As the first protrusion 56 is guided by the first recess 87 and the second protrusion 66 is guided by the second recess 97, the first tubular portion 53 is inserted into the first insertion port 43 without interfering with the first terminal accommodating portion 81. Then, each first conductive member 52 is inserted into the corresponding first terminal accommodating chamber 83 via the first conductive member insertion hole 86 to be inserted into and connected to the corresponding first connection terminal 82. In this manner, when the first protrusion 56 is guided by the first recess 87, and the second protrusion 66 is guided by the second recess 97, the first tubular portion 53 is inserted into the first insertion port 43 without interfering with the first base-side connector unit 80. Each first conductive member 52 is thus connected to the first base-side connector unit 80.

As the first protrusion 56 is guided by the first recess 87 and the second protrusion 66 is guided by the second recess 97, the second tubular portion 63 is inserted into the second insertion port 44 without interfering with the second terminal accommodating portion 91. Then, each second conductive member 62 is inserted into the corresponding second terminal accommodating chamber 93 via the second conductive member insertion hole 96 to be inserted into and connected to the corresponding second connection terminal 92. In this manner, when the first protrusion 56 is guided by the first recess 87, and the second protrusion 66 is guided by the second recess 97, the second tubular portion 63 is inserted into the second insertion port 44 without interfering with the second base-side connector unit 90. Each second conductive member 62 is thus connected to the second base-side connector unit 90.

Therefore, when the first protrusion 56 is guided by the first recess 87 and the second protrusion 66 is guided by the second recess 97, the first electromagnetic valve-side connector unit 55 is inserted into the first insertion port 43 without interfering with the section of the base 30 around the first insertion port 43. The first electromagnetic valve-side connector unit 55 is thus connected to the first base-side connector unit 80. Also, when the first protrusion 56 is guided by the first recess 87 and the second protrusion 66 is guided by the second recess 97, the second electromagnetic valve-side connector unit 65 is inserted into the second insertion port 44 without interfering with the section of the base 30 around the second insertion port 44. The second electromagnetic valve-side connector unit 65 is thus connected to the second base-side connector unit 90.

When the first protrusion 56 is guided to a section further inward than the receiving port in the first recess 87 and the second protrusion 66 is guided to a section further inward than the receiving port in the second recess 97, the first electromagnetic valve-side connector unit 55 is positioned in a location where the first tubular portion 53 does not interfere with the first base-side connector unit 80. When the first protrusion 56 is guided to a section further inward than the receiving port in the first recess 87 and the second protrusion 66 is guided to a section further inward than the receiving port in the second recess 97, the second electromagnetic valve-side connector unit 65 is positioned in a location where the second tubular portion 63 does not interfere with the second base-side connector unit 90.

Also, when the first protrusion 56 is guided by the first recess 87 and the second protrusion 66 is guided by the second recess 97, relative positions of each bolt insertion hole 38h and the corresponding internal thread hole 39 agree with each other.

Operation of Embodiment

Operation of the present embodiment will now be described.

When connecting the first electromagnetic valve-side connector unit 55 to the first base-side connector unit 80 and connecting the second electromagnetic valve-side connector unit 65 to the second base-side connector unit 90, the first protrusion 56 is guided by the first recess 87, and the second protrusion 66 is guided by the second recess 97. Accordingly, the first electromagnetic valve-side connector unit 55 is inserted into the first insertion port 43 without interfering with the section of the base 30 around the first insertion port 43. Specifically, the first tubular portion 53 is inserted into the first insertion port 43 without interfering with the section of the base 30 around the first insertion port 43. Further, the first tubular portion 53 is inserted into the first insertion port 43 without interfering with the first base-side connector unit 80, so that each first conductive member 52 is connected to the first base-side connector unit 80.

Also, the second electromagnetic valve-side connector unit 65 is inserted into the second insertion port 44 without interfering with the section of the base 30 around the second insertion port 44. Specifically, the second tubular portion 63 is inserted into the second insertion port 44 without interfering with the section of the base 30 around the second insertion port 44. Further, the second tubular portion 63 is inserted into the second insertion port 44 without interfering with the second base-side connector unit 90, so that each second conductive member 62 is connected to the second base-side connector unit 90. Accordingly, the first electromagnetic valve-side connector unit 55 is smoothly connected to the first base-side connector unit 80, and the second electromagnetic valve-side connector unit 65 is smoothly connected to the second base-side connector unit 90.

When each first conductive member 52 is connected to the first base-side connector unit 80 and each second conductive member 62 is connected to the second base-side connector unit 90, the connector member 70 is allowed to move slightly in the longitudinal direction and the traverse direction of the base portion 71. This facilitates the connection of each first conductive member 52 to the first base-side connector unit 80 and the connection of each second conductive member 62 to the second base-side connector unit 90.

Advantages of Embodiment

The above-described embodiment has the following advantages.

(1) The electromagnetic valve 11 includes the first protrusion 56 and the second protrusion 66. The base 30 includes the first recess 87, which guides the first protrusion 56, and the second recess 97, which guides the second protrusion 66. When the first protrusion 56 is guided by the first recess 87 and the second protrusion 66 is guided by the second recess 97, the first electromagnetic valve-side connector unit 55 is inserted into the first insertion port 43 without interfering with the section of the base 30 around the first insertion port 43. The first electromagnetic valve-side connector unit 55 is thus connected to the first base-side connector unit 80. Also, when the first protrusion 56 is guided by the first recess 87 and the second protrusion 66 is guided by the second recess 97, the second electromagnetic valve-side connector unit 65 is inserted into the second insertion port 44 without interfering with the section of the base 30 around the second insertion port 44. The second electromagnetic valve-side connector unit 65 is thus connected to the second base-side connector unit 90. This allows the first electromagnetic valve-side connector unit 55 to be smoothly connected to the first base-side connector unit 80, and the second electromagnetic valve-side connector unit 65 to be smoothly connected to the second base-side connector unit 90. This improves the ease of mounting for the electromagnetic valve manifold 10.

(2) When the first protrusion 56 is guided by the first recess 87, and the second protrusion 66 is guided by the second recess 97, the first tubular portion 53 is inserted into the first insertion port 43 without interfering with the first base-side connector unit 80. Each first conductive member 52 is thus connected to the first base-side connector unit 80. When the first protrusion 56 is guided by the first recess 87, and the second protrusion 66 is guided by the second recess 97, the second tubular portion 63 is inserted into the second insertion port 44 without interfering with the second base-side connector unit 90. Each second conductive member 62 is thus connected to the second base-side connector unit 90. This allows the first electromagnetic valve-side connector unit 55 to be smoothly connected to the first base-side connector unit 80, and the second electromagnetic valve-side connector unit 65 to be smoothly connected to the second base-side connector unit 90. This further improves the ease of mounting for the electromagnetic valve manifold 10.

(3) The width of the first recess 87 is larger at the receiving port, which receives the first protrusion 56, than at the inner section, which is located further inward than the receiving port. This allows the first protrusion 56 to be easily inserted into the first recess 87. The width of the second recess 97 is larger at the receiving port, which receives the second protrusion 66, than at the inner section, which is located further inward than the receiving port. This allows the second protrusion 66 to be easily inserted into the second recess 97. When the first protrusion 56 is guided to a section further inward than the receiving port in the first recess 87 and the second protrusion 66 is guided to a section further inward than the receiving port in the second recess 97, the first electromagnetic valve-side connector unit 55 is positioned in a location where the first tubular portion 53 does not interfere with the first base-side connector unit 80. When the first protrusion 56 is guided to a section further inward than the receiving port in the first recess 87 and the second protrusion 66 is guided to a section further inward than the receiving port in the second recess 97, the second electromagnetic valve-side connector unit 65 is positioned in a location where the second tubular portion 63 does not interfere with the second base-side connector unit 90. Therefore, even if the width of the receiving port of each of the first recess 87 and the second recess 97 is relatively large, the first tubular portion 53 is inserted into the first insertion port 43 without interfering with the first base-side connector unit 80. Each first conductive member 52 is thus connected to the first base-side connector unit 80. Also, even if the width of the receiving port of each of the first recess 87 and the second recess 97 is relatively large, the second tubular portion 63 is inserted into the second insertion port 44 without interfering with the second base-side connector unit 90. Each second conductive member 62 is thus connected to the second base-side connector unit 90. This further improves the ease of mounting for the electromagnetic valve manifold 10.

(4) When the first protrusion 56 is guided by the first recess 87 and the second protrusion 66 is guided by the second recess 97, relative positions of each bolt insertion hole 38h and the corresponding internal thread hole 39 agree with each other. This configuration prevents the bolts 38 from interfering with the gasket 37 when the bolts 38 inserted into the bolt insertion holes 38h are threaded into the respective internal thread holes 39.

Modifications

The above-described embodiment may be modified as follows. The above-described embodiment and the following modifications can be combined if the combined modifications remain technically consistent with each other.

Figure 10:
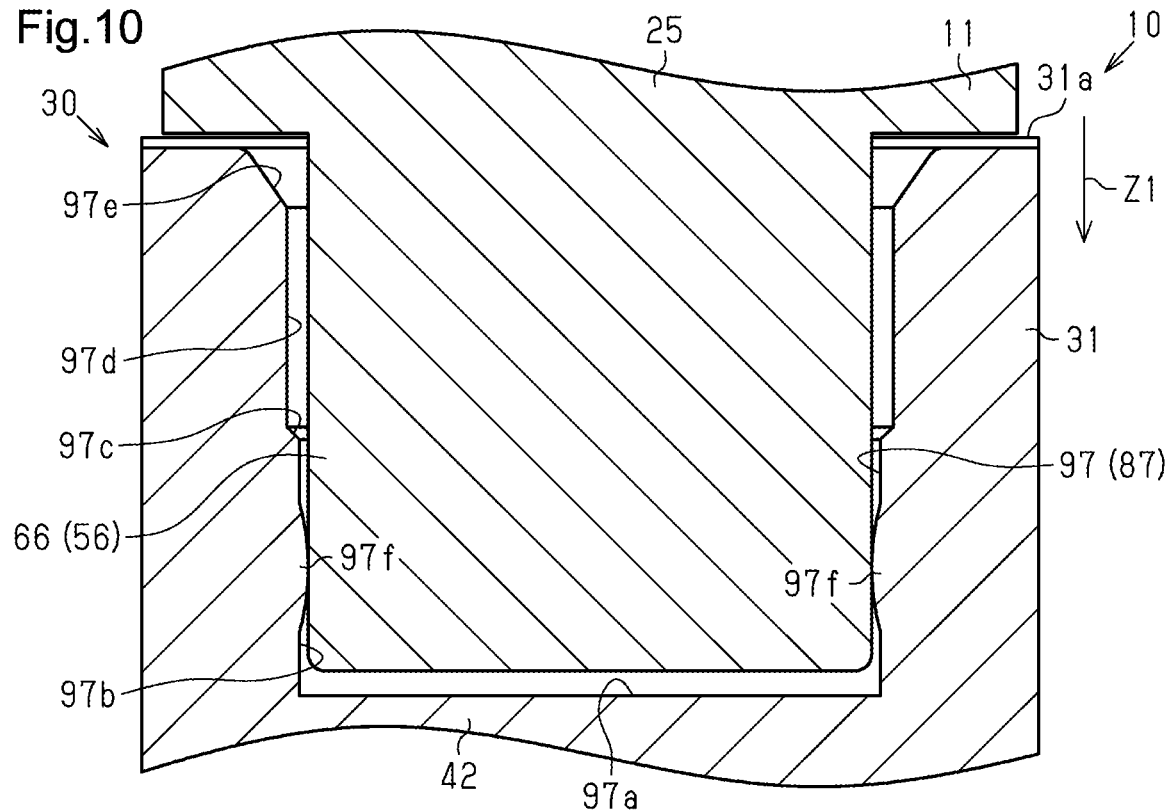
FIG. 10 is an enlarged cross-sectional view showing part of an electromagnetic valve and a base according to another embodiment.

As shown in FIG. 10, the second recess 97 may include holding portions 97f. The holding portions 97f hold the second protrusion 66. The holding portions 97f, for example, are projections that project from two opposed surfaces on the first straight surfaces 97b of the second recess 97. The holding portions 97f hold the second protrusion 66, which is inserted into the second recess 97, in a clamping manner.

With this configuration, the second protrusion 66 is held by the holding portions 97f. This prevents the electromagnetic valve 11 from separating from the base 30 after the first electromagnetic valve-side connector unit 55 is connected to the first base-side connector unit 80 and the second electromagnetic valve-side connector unit 65 is connected to the second base-side connector unit 90. The first recess 87 may also include holding portions 97f. The holding portions 97f of the first recess 87 hold the first protrusion 56.

Figure 11:
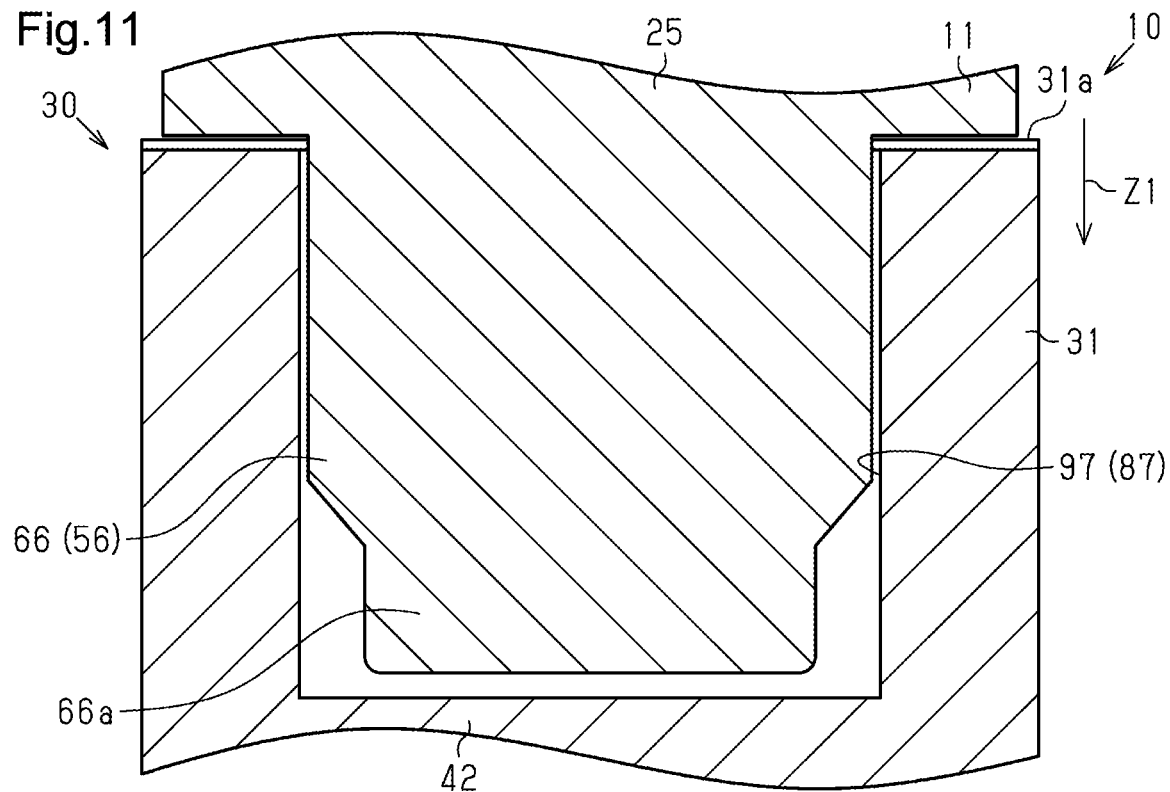
FIG. 11 is an enlarged cross-sectional view showing part of an electromagnetic valve and a base according to another embodiment.

As shown in FIG. 11, the second recess 97 does not necessarily need to have a larger width at the receiving port than at the inner section. A distal end portion 66a of the second protrusion 66 in the insertion direction into the second recess 97 may be thinner than sections other than the distal end portion 66a.

This allows the second protrusion 66 to be easily inserted into the second recess 97. When the section of the second protrusion 66 other than the distal end portion 66a is guided by the second recess 97, the first electromagnetic valve-side connector unit 55 is positioned in a location where the first tubular portion 53 does not interfere with the first base-side connector unit 80. When the section of the second protrusion 66 other than the distal end portion 66a is guided by the second recess 97, the second electromagnetic valve-side connector unit 65 is positioned in a location where the second tubular portion 63 does not interfere with the second base-side connector unit 90. Therefore, even if the distal end portion 66a in the insertion direction of the second protrusion 66 into the second recess 97 is thinner than the sections other than the distal end portion 66a, the first tubular portion 53 is inserted into the first insertion port 43 without interfering with the first base-side connector unit 80. Each first conductive member 52 is thus connected to the first base-side connector unit 80. Also, even if the distal end portion 66a in the insertion direction of the second protrusion 66 into the second recess 97 is thinner than the sections other than the distal end portion 66a, the second tubular portion 63 is inserted into the second insertion port 44 without interfering with the second base-side connector unit 90. Each second conductive member 62 is thus connected to the second base-side connector unit 90. This further improves the ease of mounting for the electromagnetic valve manifold 10.

The first recess 87 also does not necessarily need to have a larger width at the receiving port than at the inner section. A distal end portion of the first protrusion 56 in the insertion direction into the first recess 87 may also be thinner than sections other than the distal end portion.

In the above-described embodiment, for example, the base 30 may include a protrusion, and the electromagnetic valve 11 may include a recess that guides the protrusion in the same direction as the insertion direction Z1. That is, it suffices if one of the electromagnetic valve 11 and the base 30 includes a protrusion, and the other one of the electromagnetic valve 11 and the base 30 includes a recess.

In the above-described embodiment, the first electromagnetic valve-side connector unit 55 does not necessarily need to include the first tubular portion 53. Also, the second electromagnetic valve-side connector unit 65 does not necessarily need to include the second tubular portion 63. In this case also, it suffices if each first conductive member 52 is inserted into the first insertion port 43 without interfering with the section of the base 30 around the first insertion port 43 as the first protrusion 56 is guided by the first recess 87 and the second protrusion 66 is guided by the second recess 97. Also, it suffices if each first conductive member 52 is connected to the first base-side connector unit 80. Further, it suffices if each second conductive member 62 is inserted into the second insertion port 44 without interfering with the section of the base 30 around the second insertion port 44 as the first protrusion 56 is guided by the first recess 87 and the second protrusion 66 is guided by the second recess 97. Also, it suffices if each second conductive member 62 is connected to the second base-side connector unit 90.

In the above-described embodiment, the first recess 87 may include, in addition to the bottom surface 97a, the first straight surfaces 97b, and the second tapered surfaces 97e, first tapered surfaces 97c and second straight surfaces 97d as in the case of the second recess 97.

In the above-described embodiment, the first tapered surfaces 97c and the second straight surfaces 97d may be omitted from the second recess 97.

In the above-described embodiment, the first recess 87 does not necessarily need to have a larger width at the receiving port than at the inner section. Also, the second recess 97 does not necessarily need to have a larger width at the receiving port than at the inner section.

In the above-described embodiment, when the first protrusion 56 is guided by the first recess 87, and the second protrusion 66 is guided by the second recess 97, relative positions of each bolt insertion hole 38h and the corresponding internal thread hole 39 do not necessarily need to agree with each other.

In the above-described embodiment, an annular gasket may be provided between the base 30 and the set of the first pilot electromagnetic valve 50 and the second pilot electromagnetic valve 60. The gasket may provide a seal between the base 30 and the set of the first pilot electromagnetic valve 50 and the second pilot electromagnetic valve 60. In this case, the electromagnetic valve manifold 10 does not necessarily need to include the first lip packing 54 and the second lip packing 64.

Even if a gasket is provided between the base 30 and the set of the first pilot electromagnetic valve 50 and the second pilot electromagnetic valve 60, the first electromagnetic valve-side connector unit 55 is inserted into the first insertion port 43 without interfering with the gasket. Also, the second electromagnetic valve-side connector unit 65 is inserted into the second insertion port 44 without interfering with the gasket. Therefore, it is possible to avoid a sealing failure between the base 30 and the set of the first pilot electromagnetic valve 50 and the second pilot electromagnetic valve 60.

In the above-described embodiment, for example, the electromagnetic valve 11 may include only one protrusion, and the base 30 may include only one recess that guides the protrusion in the same direction as the insertion direction Z1. In this case, when the protrusion has the form of a quadrangular prism, the recess formed in the placement surface 31a is preferably, for example, a quadrangular hole-shaped recess. Any modification may be made as long as the protrusion is guided by the recess such that the first electromagnetic valve-side connector unit 55 is inserted into the first insertion port 43 and connected to the first base-side connector unit 80 without interfering with the section of the base 30 around the first insertion port 43. Also, any modification may be made as long as the protrusion is guided by the recess such that the second electromagnetic valve-side connector unit 65 is inserted into the second insertion port 44 and connected to the second base-side connector unit 90 without interfering with the section of the base 30 around the second insertion port 44.

In the above-described embodiment, the number of the first conductive members 52 is not particularly limited.

In the above-described embodiment, the number of the second conductive members 62 is not particularly limited.

In the above-described embodiment, the electromagnetic valve 11 includes the first electromagnetic valve-side connector unit 55 and the second electromagnetic valve-side connector unit 65. Instead, for example, the electromagnetic valve 11 may include only one electromagnetic valve-side connector unit. In this case, the electromagnetic valve-side connector unit includes a single tubular portion, a conductive member that is electrically connected to the first solenoid unit 51, and a conductive member that is electrically connected to the second solenoid unit 61. The single tubular portion surrounds both conductive members. The base 30 includes a single base-side connector unit.

In the above-described embodiment, the electromagnetic valve 11 may be a single-solenoid electromagnetic pilot valve. In this case, the electromagnetic valve 11 includes only one electromagnetic valve-side connector unit. The base 30 includes a single base-side connector unit.

In the above-described embodiment, the electromagnetic valve 11 may be a four-port electromagnetic valve from which, for example, the second discharge port R2 is omitted. That is, any type of electromagnetic valve may be used as the electromagnetic valve 11 as long as the electromagnetic valve 11 includes at least one discharge port. Also, the electromagnetic valve 11 may be a three-port electromagnetic valve that includes a supply port, an output port, and a discharge port.

The term "annular" as used in this description may refer to any structure that forms a loop as a whole. "Annular" shapes include but are not limited to a circular shape, an elliptic shape, and a polygonal shape with sharp or rounded corners. "Tubular" shapes include but are not limited to any structure having circular cross-sectional shape, an elliptic cross-sectional shape, and a polygonal cross-sectional shape with sharp or rounded corners.

What is claimed is:

1. An electromagnetic valve manifold, comprising:
an electromagnetic valve including a solenoid unit;
a control unit including a circuit board configured to control operation of the electromagnetic valve; and
a base that includes the control unit, wherein
the electromagnetic valve includes an electromagnetic valve-side connector unit electrically connected to the solenoid unit,
the base includes a base-side connector unit to which the electromagnetic valve-side connector unit is connected,
the base-side connector unit is configured to electrically connect the electromagnetic valve-side connector unit and the circuit board to each other,
the electromagnetic valve-side connector unit includes:
a conductive member electrically connected to the solenoid unit; and
a tubular portion that surrounds the conductive member, the base-side connector unit being inserted into the tubular portion,
the base includes an insertion port into which the electromagnetic valve-side connector unit is inserted,
the base-side connector unit is disposed inside the insertion port,
one of the electromagnetic valve or the base includes a protrusion,
the other one of the electromagnetic valve or the base includes a recess, the recess being configured to guide the protrusion in a same direction as an insertion direction of the electromagnetic valve-side connector unit into the insertion port, and
when the protrusion is guided by the recess, the electromagnetic valve-side connector unit is inserted into the insertion port without interfering with a section of the base around the insertion port and is connected to the base-side connector unit, and the tubular portion is inserted into the insertion port without interfering with the base-side connector unit, and the conductive member is connected to the base-side connector unit.

2. The electromagnetic valve manifold according to claim 1, wherein the recess includes:
a receiving port that receives the protrusion; and
an inner section that is located further inward than the receiving port in an insertion direction of the protrusion into to the recess,
the recess has a larger width at the receiving port than at the inner section, and
the electromagnetic valve-side connector unit is configured such that, when the protrusion is guided to the inner section of the recess, the tubular portion is positioned in a location where the tubular portion does not interfere with the base-side connector unit.

3. The electromagnetic valve manifold according to claim 1, wherein the protrusion includes:
a distal end portion in an insertion direction of the protrusion into to the recess; and
a portion other than the distal end portion,
the distal end portion is thinner than the portion other than the distal end portion, and
the electromagnetic valve-side connector unit is configured such that, when the portion other than the distal end portion is guided by the recess, the tubular portion is positioned in a location where the tubular portion does not interfere with the base-side connector unit.

4. The electromagnetic valve manifold according to claim 1, wherein
the electromagnetic valve is fixed to the base with a bolt,
the electromagnetic valve includes a bolt insertion hole through which the bolt is inserted,
the base includes an internal thread hole into which the bolt is threaded,
a gasket is arranged between the electromagnetic valve and the base, and
as the protrusion is guided by the recess, relative positions of the bolt insertion hole and the internal thread hole agree with each other.

5. The electromagnetic valve manifold according to claim 1, wherein the recess includes a holding portion configured to hold the protrusion.

* * * * *